Aug. 6, 1940.  B. MAHLKE  2,210,765
MEAT CUTTING MACHINE
Filed April 22, 1938  3 Sheets-Sheet 2
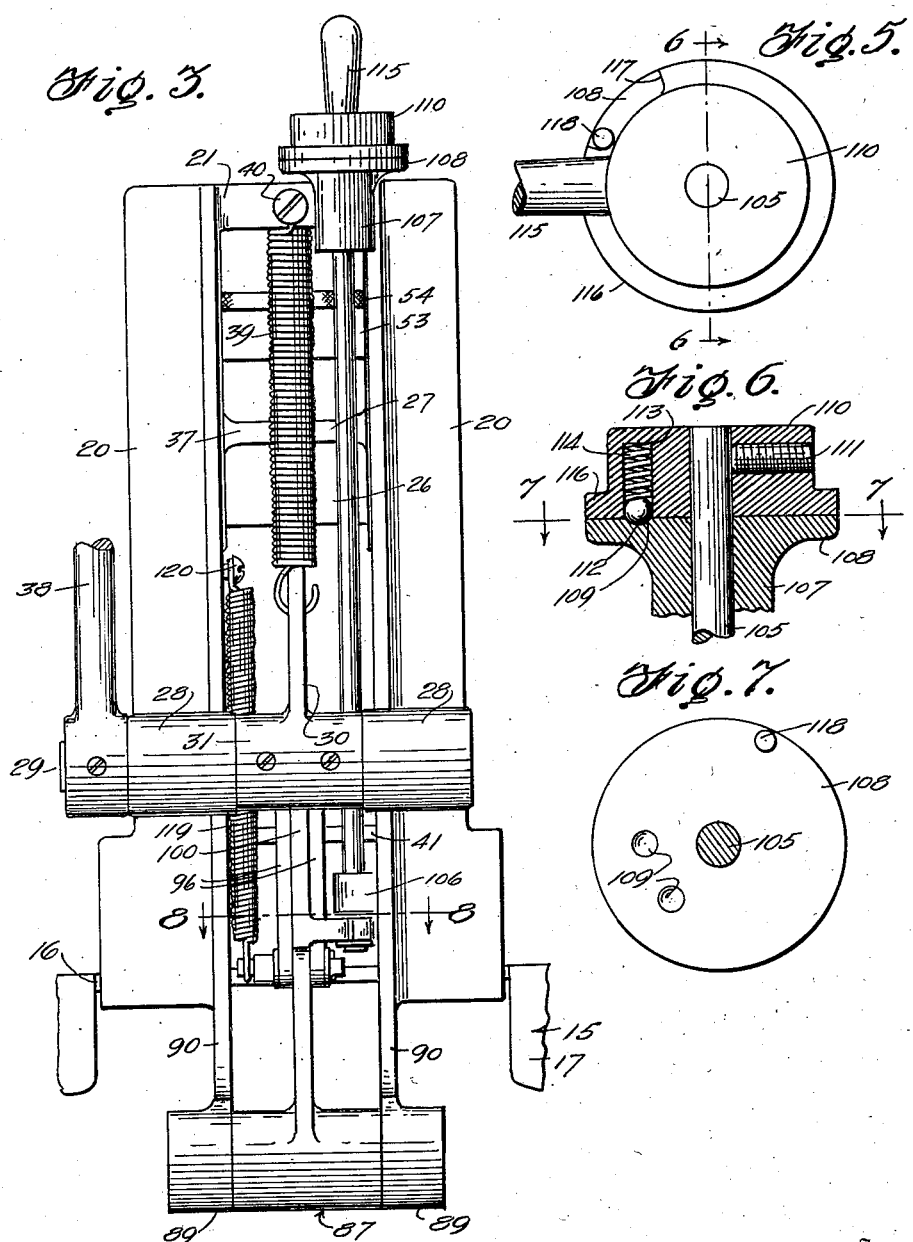
Inventor
BRUNO MAHLKE,
By Kimmel & Crowell
Attorneys.

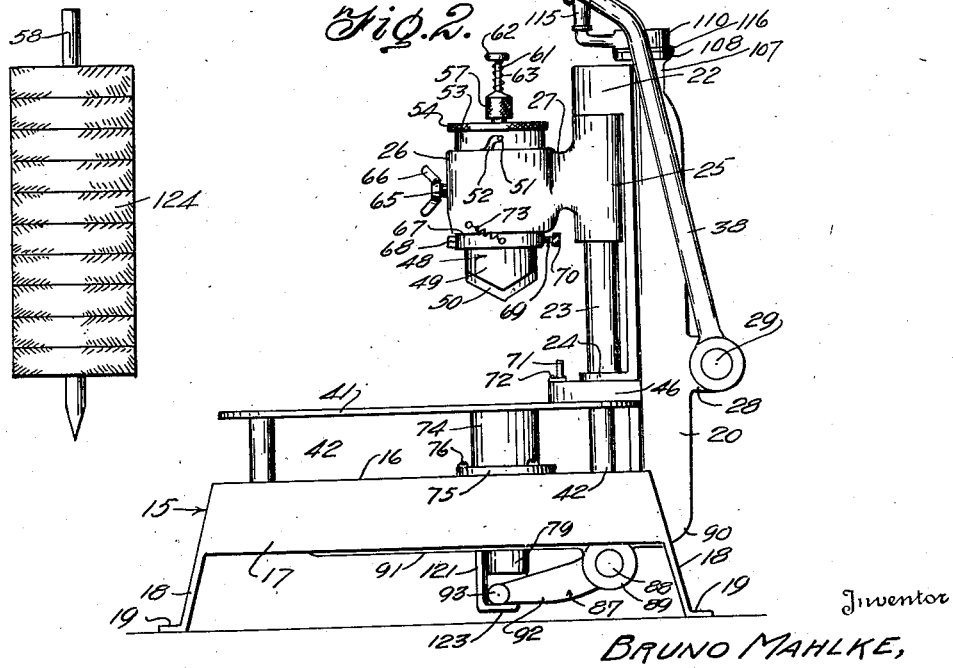
Aug. 6, 1940.   B. MAHLKE   2,210,765
MEAT CUTTING MACHINE
Filed April 22, 1938   3 Sheets-Sheet 1
Inventor
BRUNO MAHLKE,
By Kimmel & Crowell
Attorneys.

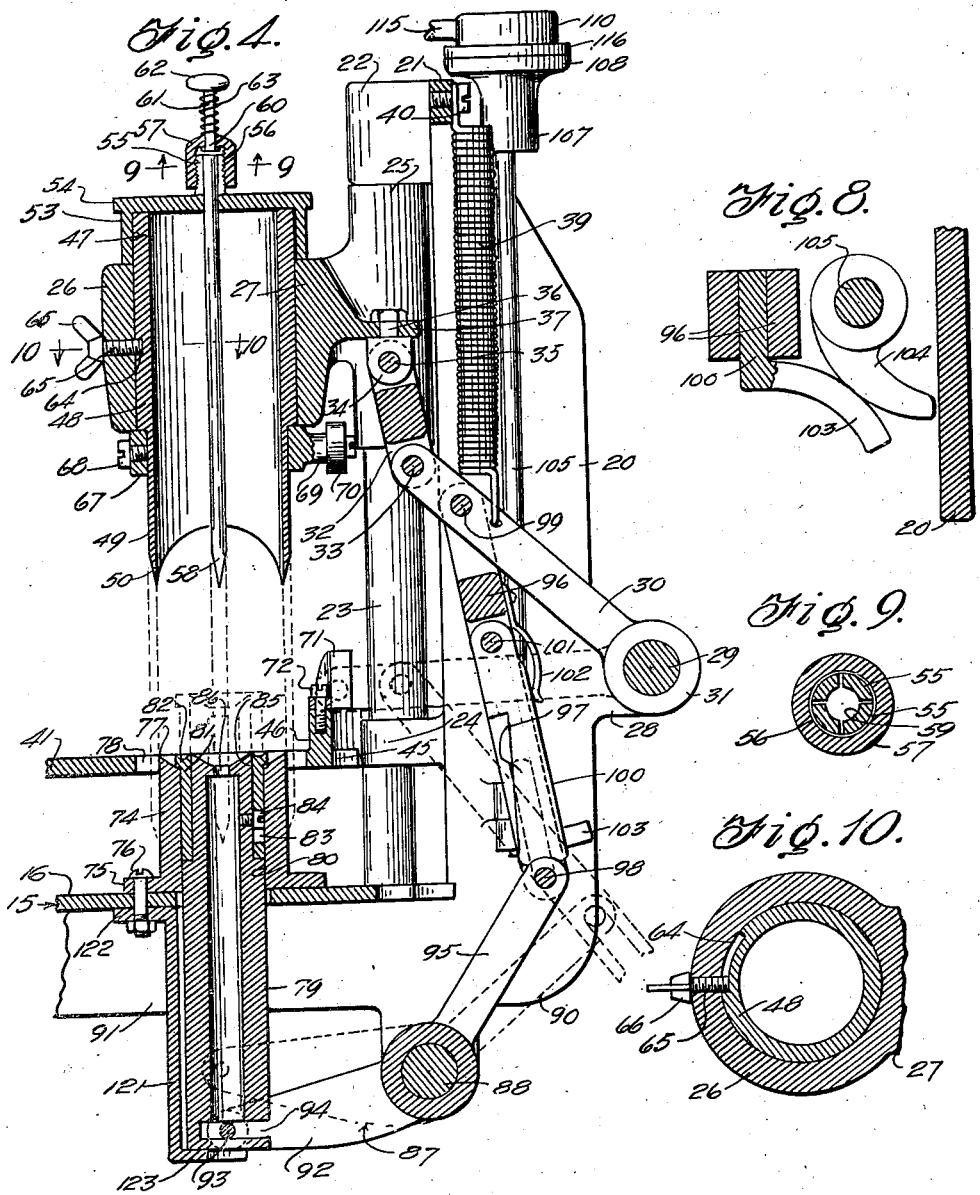

Patented Aug. 6, 1940

2,210,765

UNITED STATES PATENT OFFICE 2,210,765

MEAT CUTTING MACHINE

Bruno Mahlke, Marinette, Wis.

Application April 22, 1938, Serial No. 203,705

15 Claims. (Cl. 17—1)

This invention relates to a meat machine and a method of producing an article of meat product which in the trade is known as city or mock chicken.

An object of this invention is to provide a meat cutting machine which is so constructed that initially sliced meat may be die cut and at the same time impaled by a skewer.

Another object of this invention is to provide an improved machine which is capable of simultaneously cutting and impaling the cut pieces of meat by a skewer so as to eliminate the necessity of manually cutting the meat with a knife into predetermined small pieces and subsequently impaling the pieces with a skewer.

A further object of this invention is to provide a machine of this kind which is so constructed that two or more slices of meat may be die cut at the same time and the die cut meat also simultaneously impaled by a skewer.

A still further object of this invention is to provide an improved method of producing skewered meats which includes the die cutting of a plurality of slices or laminations of meat and the simultaneous impaling of the cut slices by a skewer upon which the die cut slices are retained.

Still another object of this invention is to provide a machine of this kind which is so constructed that a considerable saving in time and labor is accomplished in the production of skewered meat which is initially cut in relatively thin slices and subsequently formed into patties of small pieces held together by means of a skewer or other holding means.

To the above objects and others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention.

In the drawings:

Figure 1 is a detail top plan of a meat working or cutting machine constructed according to an embodiment of this invention, Figure 2 is a detail side elevation of the machine, Figure 3 is an enlarged fragmentary rear elevation of the machine, Figure 4 is an enlarged fragmentary vertical section taken on the line 4—4 of Figure 1, Figure 5 is a fragmentary top plan of the plunger controlling means, Figure 6 is a sectional view taken on the line 6—6 of Figure 5, Figure 7 is a sectional view taken on the line 7—7 of Figure 6, Figure 8 is an enlarged sectional view taken on the line 8—8 of Figure 3, Figure 9 is an enlarged sectional view taken on the line 9—9 of Figure 4, Figure 10 is an enlarged fragmentary sectional view taken on the line 10—10 of Figure 4, Figure 11 is a fragmentary front elevation showing the means for effecting rotation of the cutter during reciprocation thereof, and Figure 12 is a detail side elevation of a laminated meat product formed by this machine.

Referring to the drawings, the numeral 15 designates generally a base structure comprising a top plate 16 having dependent flanges 17 and supporting legs 18 which may be outturned as at 19 so as to provide feet which, if desired, may be bolted or fastened to a suitable support. A pair of upstanding right angular supporting members 20 are secured at their lower ends to the rear of the base 15 and are connected together at their upper ends by a connecting bar 21. A forwardly projecting boss 22 is carried by each supporting member 20 on the front side thereof and a vertically disposed guide member 23 engages the upper bosses 22 and also engages at the lower ends in lower bosses 24 which are also carried by the front faces of the angle supporting members 20. A pair of sleeves 25 are slidable on the guide members 23 and a die supporting sleeve or socket member 26 is secured to the sleeves 25 by a connecting member 27 in the form of a web or the like.

A pair of bosses or bearing members 28 are carried by the supporting members 20 adjacent the lower portions thereof and a shaft 29 is journalled through the bosses 28. A lever 30 is fixed to the shaft 29 between the bosses 28 being provided with a hub or sleeve 31 which is fixed in any suitable manner such as by set screws, a key or the like to the shaft 29. The lever 30 projects upwardly and between the supporting members 20 and is connected to the slide comprising the two sleeves 25 and the socket or die supporting member 26 by means of a link 32. The link 32 at its lower end is bifurcated and engages on opposite sides of the lever 30 being mounted on a pin 33. The upper end of the link 32 is also bifurcated with the bifurcations thereof engaging on opposite sides of a depending lug 34. A pin 35 engages through the link 32 and the lug 34. In the present instance, this lug 34 is provided with a threaded shank 36 which extends through a rearwardly extending web or arm 37 carried by the connecting member 27. A crank or handle 38 is secured to an end of the shaft 29 and is provided with an offset free end portion so as to permit the operation of this handle in a downward direction toward the base 15. The lever 30 is normally biased to an uppermost or to an inoperative position by means of a contractile spring 39 which at one end is secured to the lever 30 and at the opposite end is secured to the connecting member 27 as by a bolt or screw 40.

A table or platform 41 is disposed in upwardly spaced relation to the top of the base 15 being supported by means of a plurality of posts 42 which are fixed to the top of the base 15 and provided at their upper ends with reduced pins 43 engaging in holes 44 provided in the table 41. In this manner the table 41 may be readily detached from the base 15 for cleaning or other purposes without disassembling the operating parts of the machine. The table 41 at its rear edge is preferably cut out as at 45 and an upstanding flange 46 is secured along the marginal edge of the cutout portion 45 and provides a guide means to hold the meat moving laterally across the table 41 from contacting with the guides 23 or any of the other parts of the machine carried by the supporting members 20.

A die cutter generally designated as 47 is disposed in the carriage comprising the supporting member 26 and the slides 25. The cutter or die member 47 comprises a cylindrical body 48 which is open at each end and which is provided at the lower end with a reduced blade portion 49. The blade 49 is substantially V-shaped in side elevation as shown at 50 in Figure 2 so as to facilitate the cutting of the meat as the blade 49 is moved downwardly by the carriage. The upper end of the die member 47 projects above the top of the supporting sleeve or socket 26 and is provided with diametrically opposed pins 51 which are adapted to engage in a bayonet slot 52 provided in the flange 53 of a cap 54. The cap 54 is provided axially thereof with a skewer clamping member 55 in the form of a plurality of sectors, the clamping member 55 being formed by longitudinally splitting a sleeve and providing peripheral threads 56 thereon for engagement by a cap or tightening nut 57. A skewer 58 is adapted to engage in the bore 59 of the clamping member 55 and the skewer 58 may be ejected from the clamping member 55 by means of an ejecting plunger 60 having a stem 61 extending axially above the cap or tightening member 57. A knob 62 is provided on the upper end of the stem 61 and a spring 63 engages about the stem 61 and constantly holds the plunger 60 in an uppermost or inoperative position.

The periphery of the cylindrical body 48 is provided with an arcuate slot or recess 64 and a screw 65 is threaded through the sleeve 26 and is provided with a wing operating member 66 so that when desired the screw 65 can be retracted in order to permit the withdrawal of the die member 47 from the carriage 25—26.

In order to facilitate the cutting of the meat by means of the cutter 49 I have provided a cutter rotating means in the form of a ring 67 which is secured as by a set screw 68 to the die member 47 on the underside of the sleeve 26. An arm 69 is carried by the ring 67 and a roller 70 is rotatably carried by the arm 69. When the carriage is in its lowermost position, the roller 70 is adapted to engage a stationary cam 71 which is secured as by bolts or screws 72 to the upstanding flange 46. The die member 47 is biased to a normal position with the one end of the slot 64 engaging the bolt 65 by means of a spring 73 which has one end thereof secured to the sleeve 26 and the other end secured to the ring 67.

A stationary die member in the form of a cylindrical body 74 having a base flange 75 is secured as by bolts 76 to the top of the base member 15 with the upper cutting end 77 of the die member 74 projecting into an opening 78 provided in the table 41. The movable cutter or die member 47 is adapted to telescope the stationary die member 74 so that a disc-shaped piece of meat will be cut by the die member 47 and this disc-shaped piece of meat will be positioned interiorly of the die member 47.

In order to provide a means whereby during initial formation of the laminated product, the lamination may be pushed up into the interior of the movable die member 47, I have provided a plunger 79 which is slidable in the bore 80 of the stationary die member 74. The plunger 79 is provided at its upper end with a sleeve 81 having an outstanding flange 82 which engages against the upper end of the die member 74. The sleeve 81 has limited motion relative to the plunger 79 by providing an elongated slot 83 through the sleeve 81 and extending a bolt 84 through this slot 83 and threading the bolt 84 into the plunger 79. As shown in Figure 4, the upper end of the plunger 79 is reduced as at 85 so that the exterior diameter of the sleeve 81 is substantially equal to the exterior diameter of the balance of the plunger 79. The plunger 79 is also provided at its upper end with a guide opening 86 through which the lower end of the skewer 58 is adapted to pass.

The plunger 79 is operated or raised by means of a bell crank 87 which is rockably mounted on a shaft 88 carried by a pair of bosses or bearings 89. The bosses or bearings 89 are supported below the top 16 of the base member 15 by extending the right angle flange 90 of each supporting member 20 downwardly and carrying the right angle flange beneath the top 16 as shown at 91, thus providing a right angle bracing member for the top 16. The bell crank 87 has a pair of spaced apart arms 92 which extend in the direction of the lower end of the plunger 79 and a pin 93 engages between the two arms 92 and loosely engages in a slot 94 provided in the lower end of the plunger 79. In the present instance, this slot 94 opens through the periphery of the plunger 79. The bell crank 87 includes an upper arm 95 which is connected to a bifurcated link 96 with the arm 95 engaging between the bifurcations of the link 96. Preferably, the link 96 is provided with an elongated slot 97 in each bifurcated portion thereof and a pin 98 is carried by the upper end of the arm 95 and engages in the slots 97. In this manner, the bell crank 87 may be operatively connected or disconnected as will be hereinafter described. The upper end of the link 96 is connected to the operating lever 30 by means of a pin 99.

A latching member 100 is swingably mounted on a pivot 101 extending between the bifurcated portions of the link 96 and this latching member 100 is adapted when in latched position to engage the upper end of the arm 95 of the bell crank 87. The latching member 100 is held in latching position by means of a spring 102. The latching member 100 is provided with a laterally extending cam 103 which is engageable with a releasing cam 104 secured to the lower end of a shaft or releasing rod 105. The releasing rod 105 extends upwardly through a lower boss 106 carried by one of the supporting members 20 and an upper boss 107. The upper boss 107 is provided with an annular flange or plate 108 which on the upper face thereof is provided with a plurality of spaced apart recesses or detents 109. A cap or hub member 110 is secured as by a set screw 111 at the upper end of the shaft 105 and this cap member 10 is held in selected position by means of a ball 112 disposed in a socket 113. The ball 12 is constantly urged downwardly by means of a spring 114. A handle or operating member 115 is secured to the boss or cap member 110 and projects upwardly as shown in Figures 2 and 3. The cap member 110 is provided with a lower peripheral flange 116 engaging the top of the flange 108 and the flange 116 is provided with an arcuate slot or cutout portion 117. A stop pin 118 is fixed to the flange 108 and engages in the slot 117 so as to limit the rotation of the cap 110 on the boss 107.

The bell crank 87 is constantly urged to an inoperative position so as to hold the plunger 79 in a retracted or inoperative position by means of a spring 119 which has one end thereof secured to the pin 98 and the other end is fixed to a screw 120 or other stationary part of the frame structure.

A vertically disposed bar 121 extends down below the top 16 of the base member 15 and is provided at its upper end with a right angularly disposed arm 122 which is secured to the underside of the top 16 by one of the bolts 76. The lower end of the bar 121 is provided with a right angularly disposed foot or extension 123 disposed in the path of the plunger 79 so as to limit the downward movement of the plunger 79.

In the use and operation of this machine, the meat is initially cut in slices of desired thickness and in accordance with the present manner of forming what is termed city or mock chicken, several different kinds of meat are used, the meat being placed in alternate laminations. Under the practice in use at the present time where these patties or laminated food products are formed, the small pieces of food are cut to the desired size by means of a butcher knife and then the small pieces are impaled by a skewer with an alternate piece of meat being of a kind different from the remaining pieces. In accordance with the method developed through the use of this machine, at least two slices of meat are placed on the table 41 beneath the cutter or die member 47.

The slot 97 in the link 96 is of such a length that during the cutting of the meat by the cutter 47 when the lever 30 is in its lowermost position with the cutter 47 telescoping the stationary die member 74 the plunger 79 will be raised as shown in dotted lines in Figure 4 a slight distance so as to forcibly push the cut meat upwardly into the interior of the cutter 47. The slidable member 81—82 carried by the upper end of the plunger 79 is provided so as to assist in releasing the meat from the reduced end 85 of the plunger 79 so that the meat will not adhere to the reduced portion 85. The upper end of the sleeve member 81 is preferably grooved, which it has been found facilitates the above results. Without this arrangement it has been found that the meat, after cutting, tends somewhat to cling to the reduced portion 85. The upper end of the reduced portion 85 is funnelled out as a self-centering aid to the skewer 58.

Initially the operating handle 115 for the cam member 104 is in a released position or in such a position that the latching member 100 is disengaged from the pin 98 by reason of the fact that the cam member 104 is turned as viewed in Figure 8 to the left so as to swing the cam member 103 and the latch 100 outwardly from between the bifurcations of the link 96 and in this manner the cutter 47 may be lowered so as to partially telescope the stationary die member 74 with the plunger or packing member 79 inactive until the movable cutter 47 reaches substantially the end of its downward movement. When the cutter 47 has cut through the meat on the table 41 the plunger 79 is then raised a short distance by engagement of the pin 98 with the upper end of the slot 97 which will in turn rock the bell crank 87 and thus raise the plunger 79 into the cutter 47. As the plunger 79 is raised the meat lifting sleeve 81 provided with the head or flange 82 is raised therewith so that a relatively wide surface is presented to the underside of the meat and the meat is forced upwardly into the cutter 47 without distorting the meat.

This operation is repeated until a sufficient number laminations have been forced upwardly into the cutter 47 to provide the desired size of article which is termed city chicken or the like. The upper end or top of the cap member 54 is preferably provided with a pair of openings or holes 125 which serve the purpose of venting air on the upper side of the meat laminations, and in addition provide a means in the form of sight openings by which the operator may be able to determine when the cutter 47 has been substantially filled.

When it has been determined that the cutter 47 has been substantially filled the cap member 54 may be turned as viewed in Figure 2 to the right so as to partially release the pin 51 on the flange 53 of the cap from the bayonet slot 52. Before the handle 38 is lowered on the next cutting operation the handle 115 is swung to the position whereby the cam member 104 is substantially disengaged from the cam 103. This position is substantially as shown in Figure 8. In this position, the spring 102 may readily swing the latching member 100 between the bifurcations of the link 96 so that the lower end of the latch member 100 will engage the pin 98. The handle 38 may then be lowered and as the lever 30 is rocked downwardly carrying therewith the cutter carriage, the bell crank 87 will be rocked so that the plunger 97 will move upwardly within the cutter 47 for substantially the entire length of the cutter 47. This movement of the plunger 79 will act as an ejecting movement and will force the laminated product within the cutter 47 together with the cap 54 out of the cutter 47. During this operation the cutter 47 will not cut any laminated meat particles as the plunger 79 is in a partially raised position relative to the table 41 before the cutter 47 engages over the stationary die member 74.

While I have shown the shaft 29 having a handle 38 secured thereto for manual operation of the device it will, of course, be understood that if desired, the shaft 29 may be rocked by a power means so that the cutter carriage can be reciprocated without the necessity of manually rocking the shaft 29 by the handle herein disclosed.

While the device may be used for impaling the discs of meat on the skewer 58, it will be understood that if desired, the device may be used to cut or dice meats. Where this is done, a blunt ended skewer may be secured in the skewer holding means and the plunger 79 may be removed so that when the cutter 47 is lowered to a cutting position the meat will drop and be forced by the blunt skewer down through the opening formed by the removal of the plunger 79 and onto the table upon which the machine sets, from whence the cut pieces of meat may then be removed.

When it is desired to clean or sharpen the cutter 47 the screw 65 is unthreaded so as to withdraw the inner end thereof out of the arcuate slot 64. The roller carrying ring 67 may also be released and the entire cutter pulled through the top of the carriage.

What I claim is:

1. The method of producing a laminated food product which includes the simultaneous die cutting and impaling the laminations of the product by a skewer common thereto.

2. The method of producing a laminated meat product which includes the simultaneous die cutting and impaling of the meat laminations on a common skewer at an angle to the latter whereby the laminations are retained on the skewer.

3. A meat machine comprising a frame, a table carried by said frame, and a hollow cutter carried by said frame and supported for movement toward or away from said frame, said cutter having diametrically opposed V-shaped keen edge portions.

4. A meat machine comprising a frame, a table carried by said frame, a movable cutter member, means supporting said movable cutter member for movement toward or away from said table, operating means for said cutter, and a skewer supporting means disposed concentrically of said cutter for releasably supporting a skewer in a manner whereby to impale a slice of meat simultaneously with the cutting of the slice of meat by said cutter.

5. A meat machine comprising a frame, a table carried by said frame, a stationary die member carried by said frame, a reciprocating die member, means supporting said reciprocating die member for movement toward or away from said stationary die member, a cam carried by said table, and a part carried by said reciprocating die member engageable with said cam to partially rotate said reciprocating die member.

6. A meat machine comprising a stationary table, a reciprocating carriage, means supporting said carriage for reciprocating movement toward or away from said table, a hollow die member carried by said carriage, means for reciprocating said carriage, a stationary die member supported in fixed position relative to said table, operating means for said carriage, and means for releasably supporting a skewer interiorly of said hollow die member in a manner whereby to impale an article cut by said hollow die member.

7. A meat machine comprising a horizontally disposed table, guide means extending upwardly of said table, a carriage slidably engaging said guide means, operating means for said carriage, a stationary die member disposed in a fixed position relative to said table with the upper end thereof substantially flush with said table, a cylindrical die member carried by said carriage adapted to partially telescope said stationary die member upon movement of said carriage in one direction, and a skewer supporting means carried by said cylindrical die member.

8. A meat machine comprising a horizontally disposed table, guide means extending upwardly of said table, a carriage slidably engaging said guide means, operating means for said carriage, a stationary die member, means securing said stationary die member in a position with the upper end thereof substantially flush with the upper surface of said table, a cylindrical die member, means securing said cylindrical die member to said carriage, and vertically movable means active upon downward movement of said carriage and said cylindrical die member whereby to force the article cut by said die members upwardly into said cylindrical die member.

9. A meat machine comprising a horizontally disposed table, guide means extending upwardly of said table, a carriage slidably engaging said guide means, operating means for said carriage, a stationary die member, means securing said stationary die member in a position with the upper end thereof substantially flush with the upper surface of said table, a cylindrical die member, means securing said cylindrical die member to said carriage, and vertically movable means active upon downward movement of said carriage and said cylindrical die member whereby to force the article cut by said die members upwardly into said cylindrical die member.

10. A meat machine comprising a frame, a table carried by said frame, vertically disposed guide means carried by said frame, a carriage slidably carried by said guide means, a cylindrical cutter carried by said guide means, operating means for said carriage, a cap engaging the upper end of said cylindrical cutter, and a skewer holding means carried by said cap for detachably supporting a skewer axially of said cylindrical cutter.

11. A meat machine comprising a frame, a table carried by said frame, an upwardly extending guide means carried by said frame, a carriage slidable on said guide means, a cylindrical cutter engaging said carriage, means detachably securing said cutter to said carriage, and means carried by said frame and said cutter whereby to partially rotate said cutter only during the cutting operation.

12. A meat machine comprising a frame, a table carried by said frame, vertically disposed guide means extending upwardly of said table, a carriage slidably engaging said guide means, operating means for said carriage, a cylindrical cutter, means detachably securing said cutter to said carriage for movement of said cutter toward or away from said table, a cap engaging the upper end of said cutter, means detachably securing said cap on said cutter, a skewer holding means carried by said cap for releasably holding a skewer in dependent position axially of said cutter, and means carried by said cap for releasing said skewer from said latter means.

13. A meat machine comprising a frame, a table carried by said frame, upwardly extending guide means carried by said frame, a carriage slidably engaging said guide means, a cylindrical cutter, means detachably securing said cutter to said carriage, a stationary die member extending below said table, said table having an opening therethrough whereby said cylindrical cutter may partially telescope said stationary die member, means carried by said cylindrical cutter for supporting a skewer axially thereof, a packing member slidably engaging said stationary die member, and means connecting said packing member with said operating means whereby said packing member will move upwardly into said cylindrical cutter coactive with the downward movement of said cylindrical cutter in a manner to impale the material cut by said cylindrical cutter on said skewer.

14. A meat machine comprising a frame, a horizontally disposed table carried by said frame, vertically disposed guide means carried by said frame, a carriage slidably engaging said guide means, a cylindrical cutter carried by said carriage, means engaging said cylindrical cutter for releasably holding a skewer axially and interiorly of said cutter, a stationary die member extending below said table and having the upper end thereof substantially flush with the top of said table, said cylindrical die member adapted to partially telescope over said stationary die member, a packing member slidably engaging interiorly of said stationary die member, means carried by said packing member to release the meat from said stationary die member, a bell crank rockably carried by said frame having one arm thereof engageable with said packing member, a link engaging said operating means provided with an elongated slot therein, a pin engaging through another arm of said bell crank and said elongated slot, a spring pressed latching member carried by said link engageable with said other arm to hold said other arm against movement longitudinally of said slot, a cam carried by said latching member, and releasing means disposed in the path of said cam whereby to disengage said cam from said arm of said bell crank to thereby release said bell crank from said operating means.

15. The method of producing a laminated meat product which includes the simultaneous die cutting and impaling meat laminations axially thereof on a skewer common to said laminations.

BRUNO MAHLKE.